(12) United States Patent
Tsuruta (10) Patent No.: US 7,401,463 B2
(45) Date of Patent: Jul. 22, 2008

(54) HEAT SHIELD FOR INTERNAL COMBUSTION ENGINE EXHAUST SYSTEM

(75) Inventor: Yuuichirou Tsuruta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 726 days.

(21) Appl. No.: 10/661,493

(22) Filed: Sep. 15, 2003

(65) Prior Publication Data
US 2004/0083714 A1 May 6, 2004

(30) Foreign Application Priority Data
Sep. 30, 2002 (JP) .............................. 2002-287988

(51) Int. Cl.
*F01N 5/02* (2006.01)
*F01N 3/02* (2006.01)
*F01N 7/10* (2006.01)
(52) U.S. Cl. .............................. 60/320; 60/321; 60/323; 138/110; 138/114
(58) Field of Classification Search ................... 60/320, 60/321, 323; 136/110, 114
See application file for complete search history.

(56) References Cited

U.S. PATENT DOCUMENTS 3,863,445 A * 2/1975 Heath ........................... 60/299
4,955,193 A * 9/1990 Hoeptner, III ................. 60/320
5,419,125 A * 5/1995 Fukae et al. .................... 60/289
5,816,043 A * 10/1998 Wolf et al. ...................... 60/272
6,026,846 A * 2/2000 Wolf et al. ..................... 137/375
6,438,949 B1 * 8/2002 Nozaki ........................... 60/322
6,555,070 B1 * 4/2003 Kruger ........................... 422/179
6,598,389 B2 * 7/2003 Chen et al. ..................... 60/323
6,797,402 B2 * 9/2004 Chen et al. .................... 428/595
6,910,546 B2 * 6/2005 Tsutsumi et al. ............. 180/219
2003/0101719 A1 * 6/2003 Farkas ........................... 60/323
2005/0140075 A1 * 6/2005 Mishima ................. 267/140.11

FOREIGN PATENT DOCUMENTS

JP  54-120277 A  9/1979

* cited by examiner

*Primary Examiner*—Thomas Denion
*Assistant Examiner*—Loren Edwards
(74) *Attorney, Agent, or Firm*—Birch, Stewart, Kolasch & Birch, LLP (57) ABSTRACT

A heat shield for an internal combustion engine exhaust system for supporting a first heat shield plate and a second heat shield plate on a U-shaped exhaust pipe extending from an exhaust port of an engine, via a support member such as band members, and heat shield plate attachment fixtures. The first heat shield plate covers all around a curved section of the U-shaped exhaust pipe in the vicinity of the exhaust port. The second heat shield plate covers an upper part of a straight section of the U-shaped exhaust pipe and extends rearwardly from the curved section. Further, since the exhaust pipe is formed as one piece, the first heat shield plate may be formed as a simple two-part structure using the band members. With this configuration, an effective heat shielding effect can be exhibited, and cost can be reduced.

21 Claims, 11 Drawing Sheets

BACKGROUND ART

HEAT SHIELD FOR INTERNAL COMBUSTION ENGINE EXHAUST SYSTEM

CROSS-REFERENCE TO RELATED APPLICATION

The present application claims priority under 35 U.S.C. §119 to Japanese Patent Application No. 2002-287988, filed Sep. 30, 2002, the entire contents of which are hereby incorporated by reference.

BACKGROUND OF THE INVENTION

1. Field of the Invention

The present invention relates to a heat shield for an internal combustion engine exhaust system in which the heat shield can have a simple two-piece structure.

2. Description of Background Art

As a heat shield for an internal combustion engine exhaust system, it is known to divide an exhaust pipe into two parts. For example, refer to Japanese Patent Laid-open No. Sho. 54-120277 (paragraph 2, FIG. 4).

Japanese Patent Laid-open No. Sho. 54-120277 will be described in the following. The reference numerals are those used in that document.

FIG. 4 of Japanese Patent Laid-open No. Sho. 54-120277 shows an exhaust pipe in which an outer pipe a and an inner pipe b, that is inserted into the outer pipe a, are welded to a flange 4 at end sections of the respective outer pipe a and inner pipe b, and then curving processing is carried out using a roller 11 of a rotary bender B.

With the related art, the workability for welding the end sections of the outer pipe a and the inner pipe b is poor. Furthermore carrying out the bending processing on the two-part exhaust pipe with good precision requires advanced techniques, which contributes to increased cost.

SUMMARY AND OBJECTS OF THE INVENTION

The object of the present invention is therefore to provide a heat shield for an internal combustion engine exhaust system that enables the heat shield to have a two-part structure, and that also suppresses cost increases.

In order to achieve the above-described object, a first aspect of the present invention provides a heat shield for an internal combustion engine exhaust system for supporting a heat shield plate on an exhaust system member extending from an exhaust port of an internal combustion engine, via a support member such as a band member. The heat shield includes a first heat shield plate for covering all around a curved section of the exhaust system member which is provided in the vicinity of an exhaust port, and a second heat shield plate for covering above a straight section of the exhaust system member which connects to the curved section.

Conventionally, a two-part exhaust pipe is used in the vicinity of the engine in order to handle temperature. By contrast, with the present invention, by attaching a first heat shield plate for covering all around the exhaust system member to a curved section in the vicinity of the internal combustion engine using a support member such as a band member, it becomes practical to form the first heat shield plate as a two-part structure since the exhaust system member is formed as one piece. With this configuration, it is possible to exhibit heat-shielding effects and to reduce the cost.

According to a second aspect of the present invention, a small diameter section is provided on an end section of the first heat shield plate, and overlapping an end section of the second heat shield plate with this small diameter section via a gap. By overlapping an end section of the second heat shield plate with the small diameter section of the first heat shield plate via a gap, it is possible to lead travel wind from the gap to between the exhaust system member and the second heat shield plate. Thus, it is possible to improve the cooling characteristics of the exhaust system member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will now be described based on the attached drawings. The drawings are viewed in the direction of orientation of the numerals.

Figure 1:
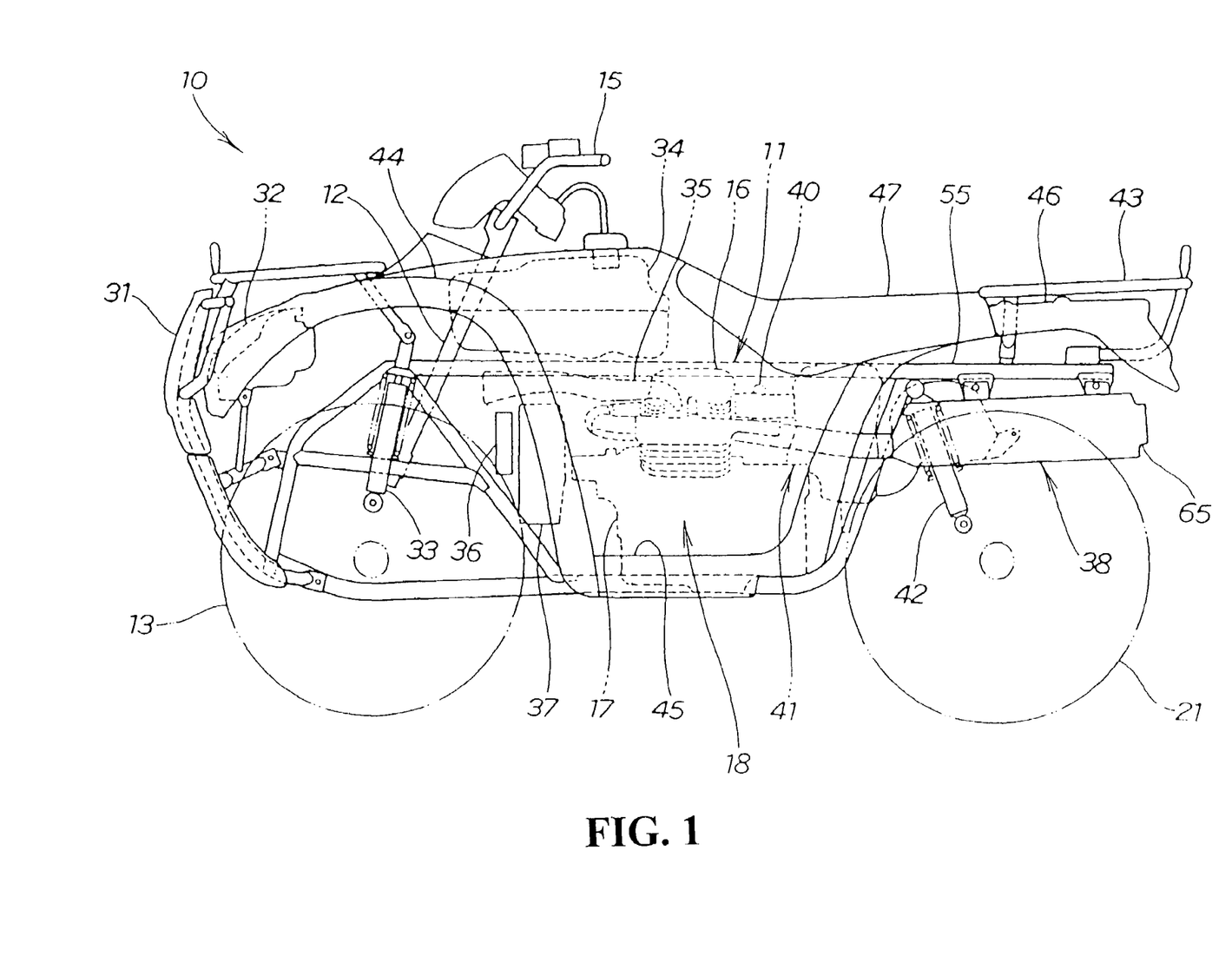
FIG. 1 is a side elevation of a vehicle fitted with an engine provided with the exhaust system heat shield of the present invention.

FIG. 1 is a side elevation of a vehicle fitted with an engine provided with the exhaust system heat shield of the present invention. The vehicle 10 is an all-terrain vehicle having a handlebar post 12 attached to a front part of a vehicle frame 11, a lower front end of the handlebar post 12 joined to left and right front wheels 13, 14 (only the near side front wheel 13 is shown in the drawing), and a handlebar 15 attached to an upper end of the handlebar post 12. The vehicle 10 also includes a power unit 18 comprising an engine 16 and a transmission 17 fitted into the middle of the vehicle frame 11, and rear wheels 21, 22 (only the near side rear wheel 21 is shown in the drawing) driven by the power unit 18 together with the front wheels 13, 14 are arranged at a rear part of the vehicle frame 11.

FIG. 1 also shows a front guard 31 for protecting the vehicle front surface, headlamps 32, 32 (only the nearside headlamp 32 is shown), are shock absorbers 33, 33 for the front wheels 13, 14 (only the nearside shock absorber 33 is shown), a fuel tank 34 attached to the vehicle frame 11, an air duct 35 for supplying air to high temperature parts of the engine 16, an oil cooler 36, a shroud 37 enclosing a fan for the oil cooler 36, and an exhaust unit 38 connected to the front of the engine 16 and extending in a curved manner towards the rear. Also shown are a carburetor 40 connected to a rear part of the engine 16, an air cleaner unit 41 connected to a rear part of the carburetor 40, shock 42, 42 absorbers for the rear wheels 21, 22 (only the near side shock absorber 42 is shown), a rear carrier 43 on which luggage is placed, front fenders 44, 44 for covering upper and upper rear parts of the front wheels 13, 14 (only the nearside fender 44 is shown), steps 45, 45 on which a driver places their feet (only the near side step 45 is shown), rear fenders 46, 46 for covering front and upper parts of the rear wheels 21, 22 (only the nearside fender 46 is shown), and a seat 47.

Figure 2:
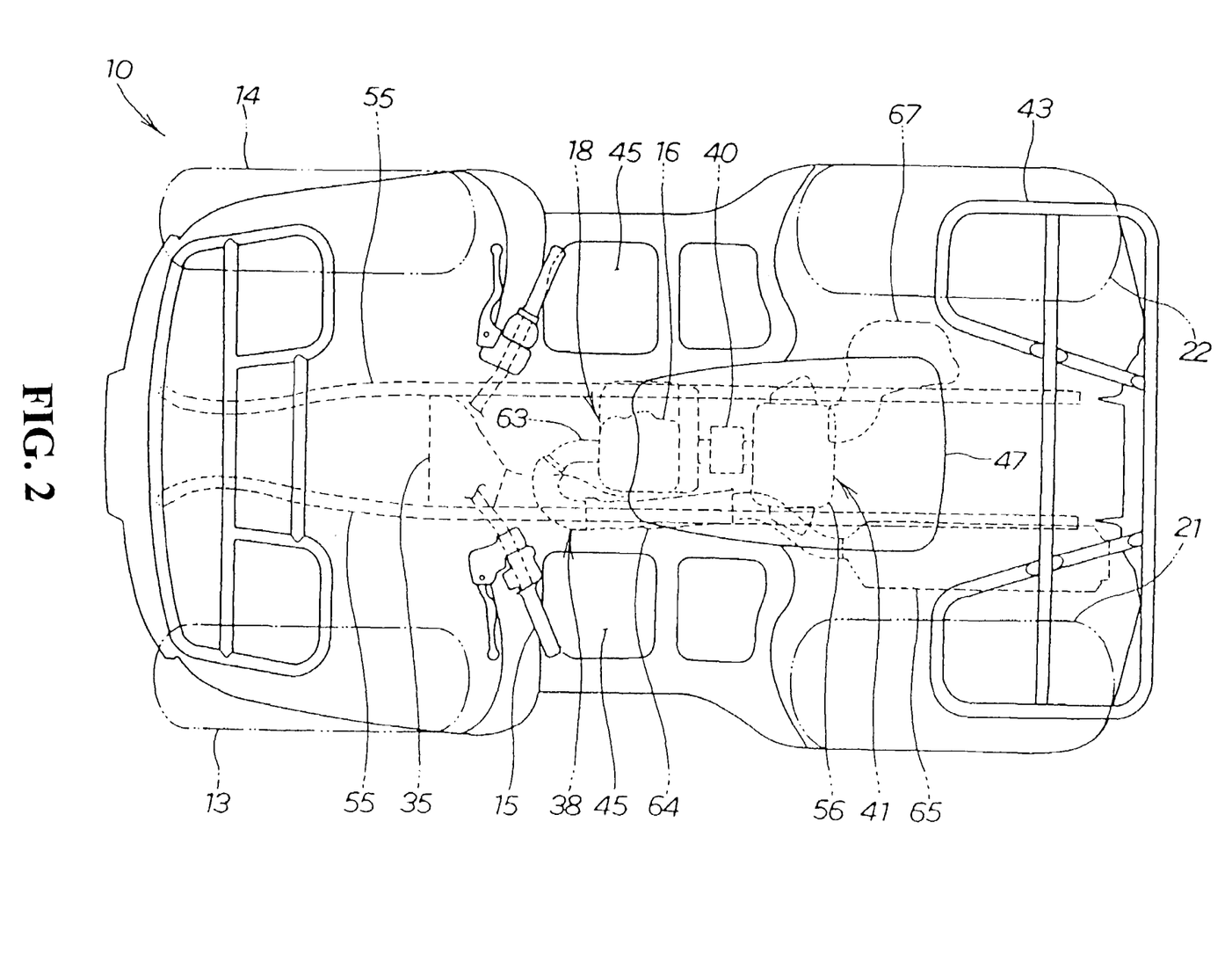
FIG. 2 is a plan view of a vehicle relating to the present invention.

FIG. 2 is a plan view of a vehicle relating to the present invention, and shows left and right main frames 55, 55 constituting part of the vehicle frame 11 arranged in the center of the vehicle and extending longitudinally, the power unit 18, air duct 35 for cooling the engine and main air cleaner 56, constituting the air cleaner unit 41, arranged between these main frames 55, 55, the front end of the air duct 35 being almost the same width as the main frames 55, 55, and the exhaust unit 38 bent in a U-shape from the engine 16 to extend towards the rear.

The exhaust unit 38 is made up of a U-shaped exhaust pipe 63 that curves in a U-shape, a middle exhaust pipe 64 connecting to a rear part of the U-shaped exhaust pipe 63, and a silencer 65 attached to a rear part of the middle exhaust pipe 64, and as shown in FIG. 1, the silencer 65 is attached to the rear part of one of the main frames 55.

The air cleaner unit 41 comprises the main air cleaner 56 connected to the carburetor 40, and a sub air cleaner 67 connected to a rear part of the main air cleaner 56. The main air cleaner 56 and the sub air cleaner 67 are arranged side by side in the longitudinal direction of the vehicle, and also, the sub air cleaner 67 is arranged outside one of the main frames 55 and inside the rear wheel 22, with the main air cleaner 56 attached to the main frames 55, 55 and a rear part of the sub air cleaner 67 being attached to one of the main frames 55.

Figure 3:
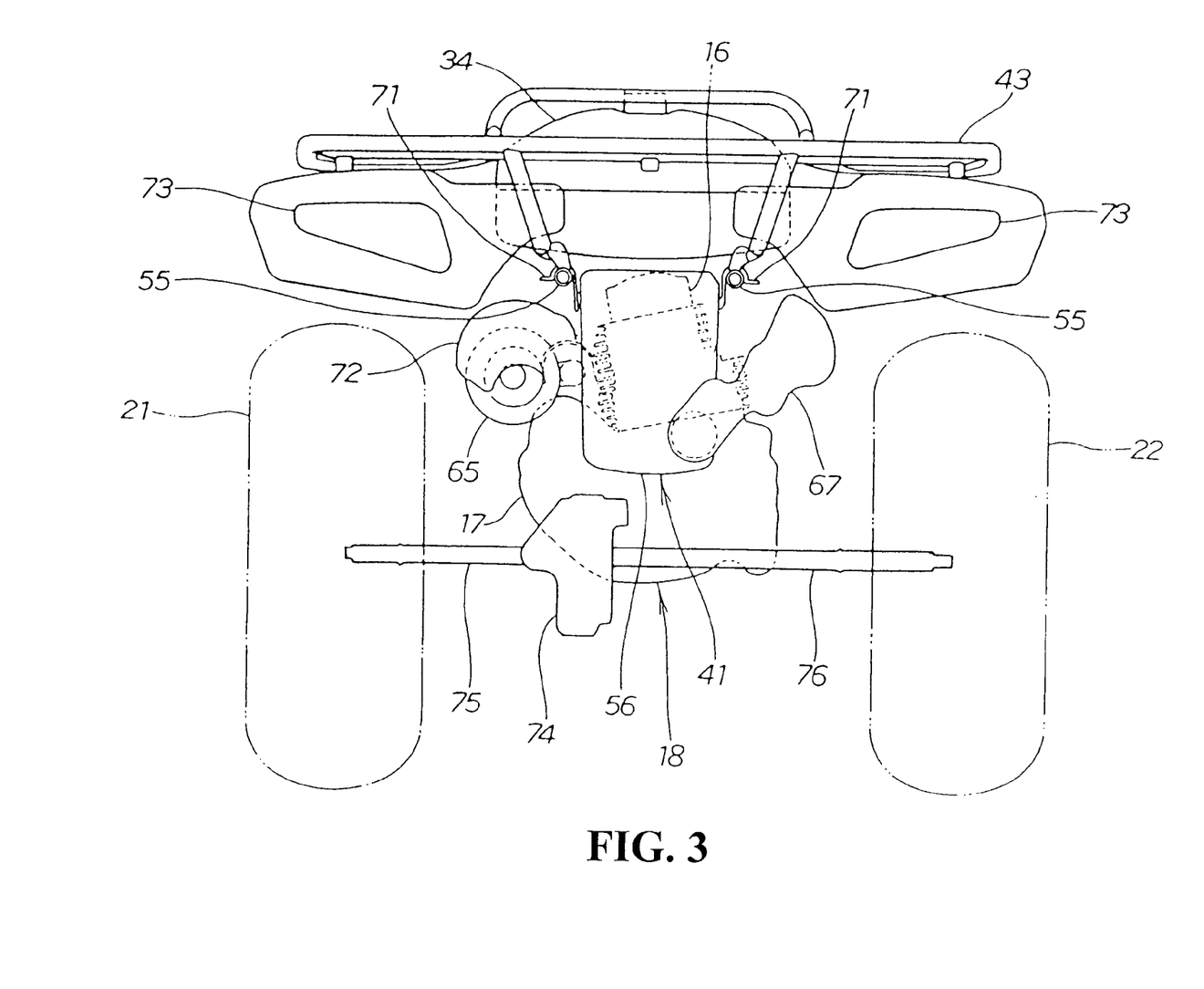
FIG. 3 is a rear view of a vehicle relating to the present invention.

FIG. 3 is a rear view of a vehicle relating to the present invention, and shows left and right upper sections of the main air cleaner 56 of the air cleaner unit 41 respectively attached to the main frames 55, 55 using attachment brackets 71, 71, and a sub air cleaner 67 connected to the rear of the main air cleaner 56 arranged in a space at the inner side of the rear wheel 22. FIG. 3 also shows a silencer heat shield plate 72 for covering an upper part and side part of a silencer 65, tail lamps 73, 73, a final reduction gear 74, rear wheels 21, 22, and axles 75, 76 respectively extending to the left and right rear wheels from the final reduction gear 74 in order to convey drive force to the rear wheels 21, 22.

Figure 4:
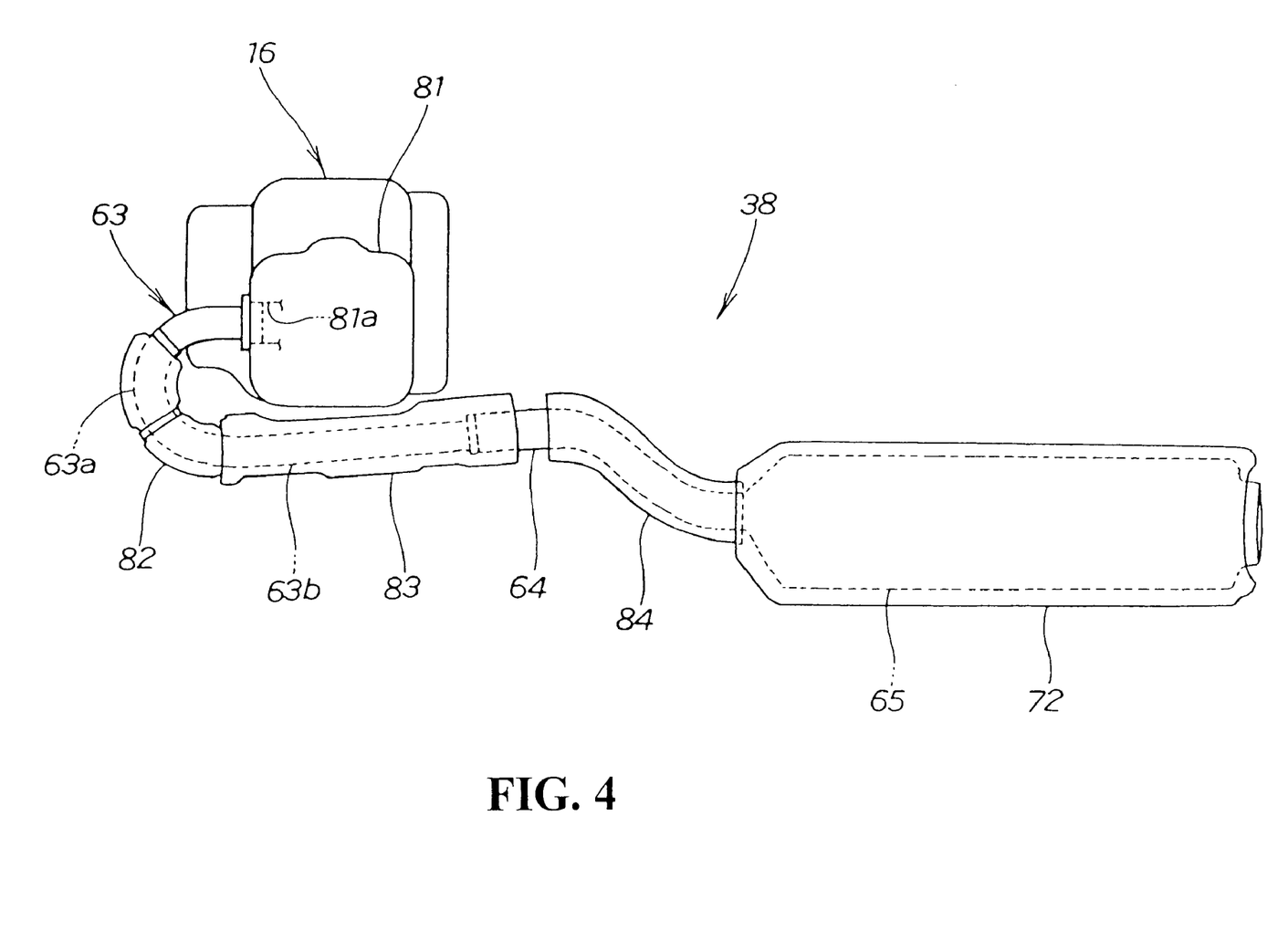
FIG. 4 is a plan view of an internal combustion engine exhaust system relating to the present invention.

FIG. 4 is a plan view of an internal combustion engine exhaust system relating to the present invention. A U-shaped exhaust pipe 63 is a member connected to an exhaust port 81a provided in the cylinder head 81 of the engine 16, and a first heat shield plate 82 for covering a curved section 63a, and a second heat shield plate 83 for covering a straight section 63b connected to the curved section 63a and part of a middle exhaust pipe 64 are attached to the U-shaped exhaust pipe 63.

The middle exhaust pipe 64 has a third heat shield plate 84 for covering most of the rear half attached.

The silencer 65 has the silencer heat shield plate 72 attached to cover almost all above.

Figure 5:
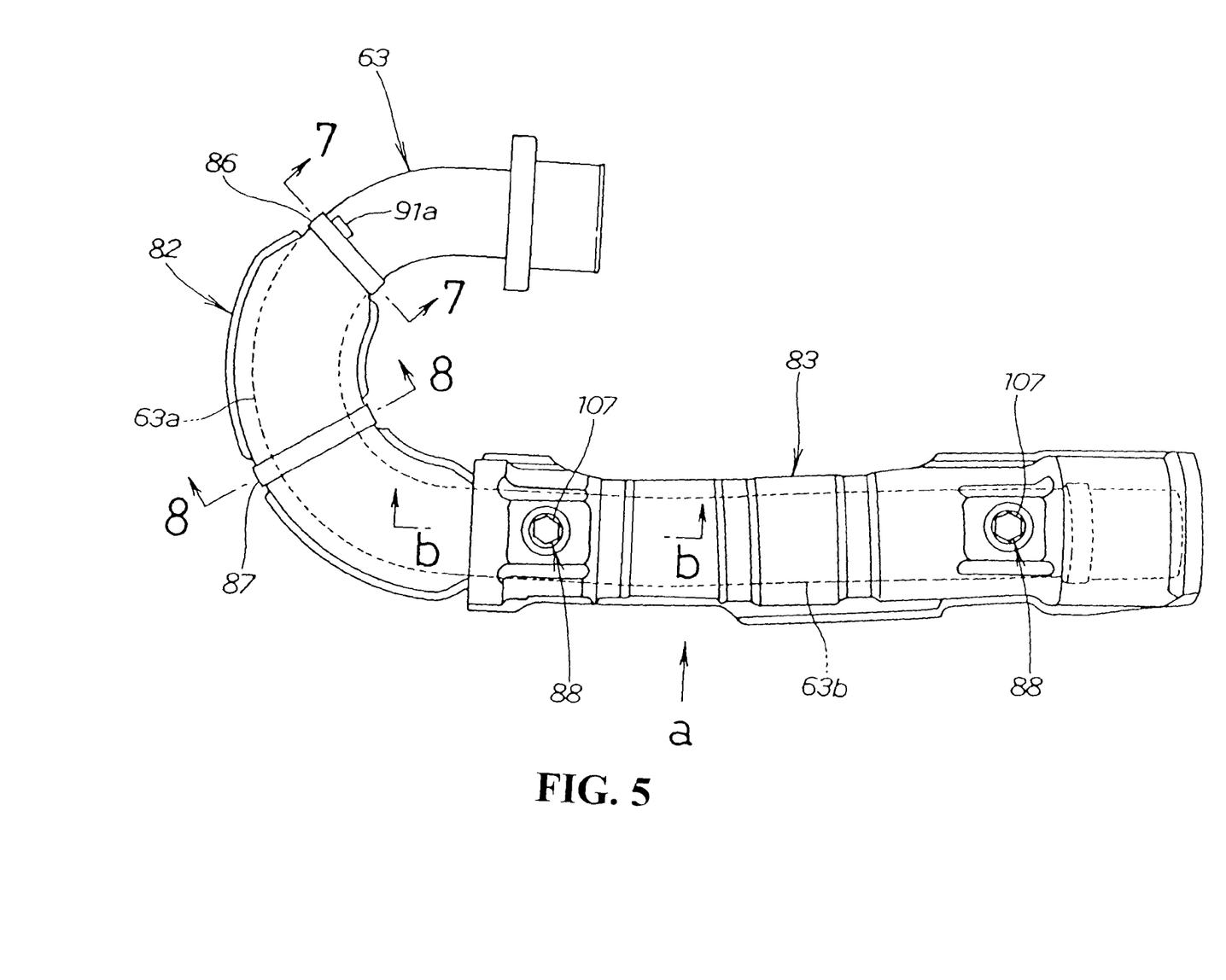
FIG. 5 is a plan view showing a U-shaped exhaust pipe and a heat shield plate relating to the present invention.

FIG. 5 is a plan view showing a U-shaped exhaust pipe and a heat shield plate relating to the present invention. The first heat shield plate 82 is attached to the U-shaped exhaust pipe 63 with band members 86, 87, and similarly, the second heat shield plate 83 is attached to the U-shaped exhaust pipe 63 with heat shield plate attachment fixtures 88, 88.

Figure 6A:
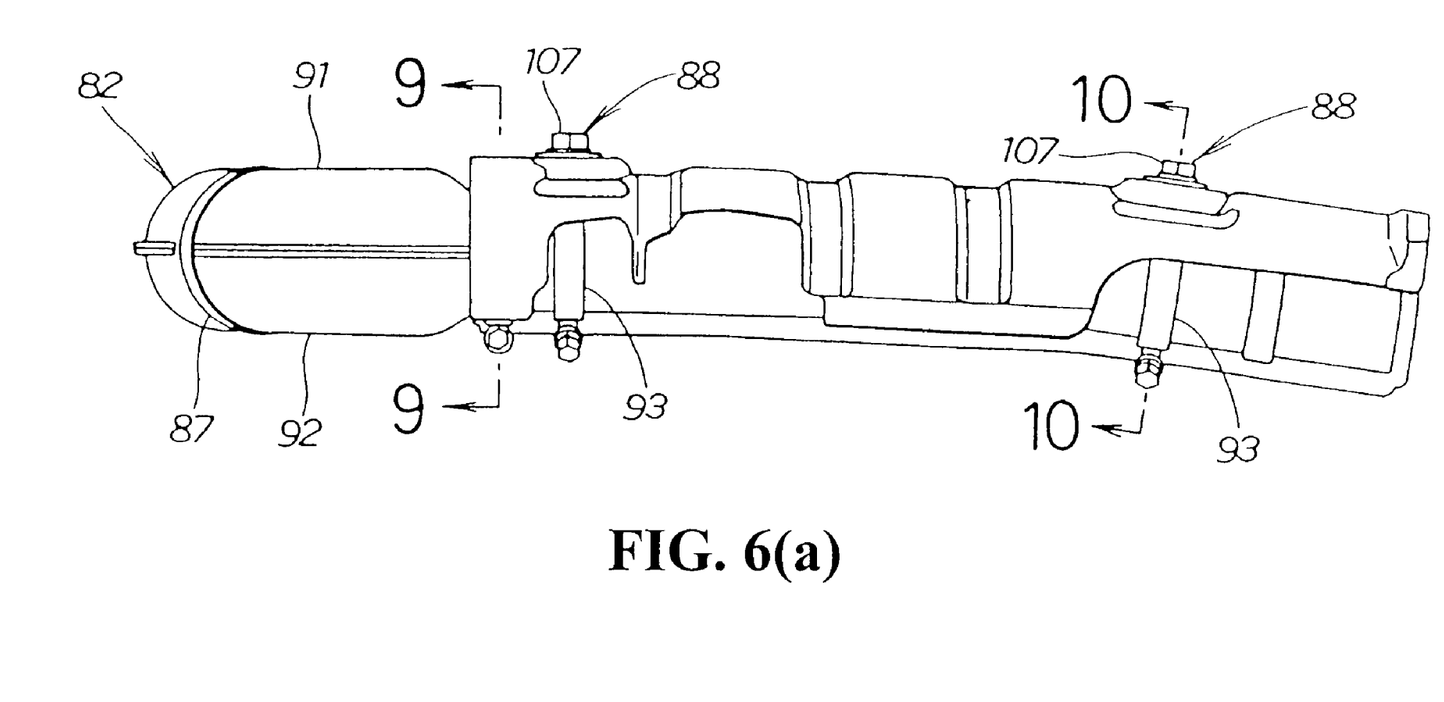
FIGS. 6(a) and (b) are explanatory drawings of a U-shaped pipe relating to the present invention.
Figure 6B:
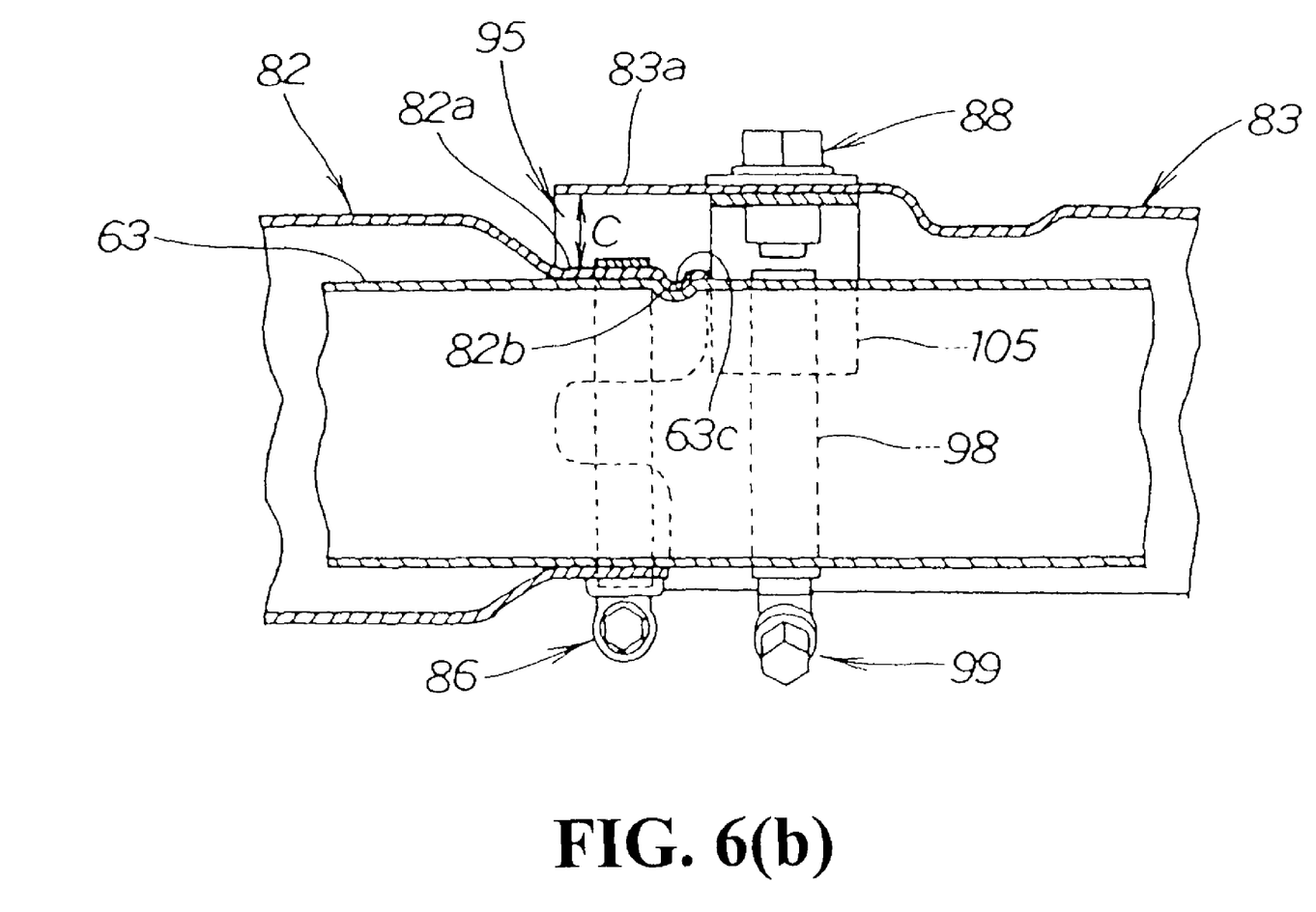

FIG. 6(a) and FIG. 6(b) are explanatory drawings of a U-shaped exhaust pipe relating to the present invention, FIG. 6(a) being a view in the direction of arrow a in FIG. 5 and FIG. 6(b) being a cross sectional view along line b-b in FIG. 5.

In FIG. 6(a), the first heat shield plate 82 is made up of an upper plate 91 and a lower plate 92, with the upper plate 91 and the lower plate 92 being aligned in the vertical direction and then fastened together using a band member 87. A heat shield plate attachment fixtures 88 for attachment of the second heat shield plate 83 are provided with band members 93, 93.

In FIG. 6(b), a small diameter section 82a is formed at the rear end of the first heat shield plate 82. This small diameter section 82a is attached to the U-shaped exhaust pipe 63 by the band member 86, and a front end section 83a of the second heat shield plate 83 is overlapped with the small diameter section 82a. Projecting section 82b engages with an indented section 63c of the U-shaped exhaust pipe 63 in order to position the first heat shield plate 82 in the U-shaped exhaust pipe 63. A gap 95 is provided between the small diameter section 82a and the front-end section 83a of the second heat shield plate 83, and C represents the size of the gap 95.

Figure 7:
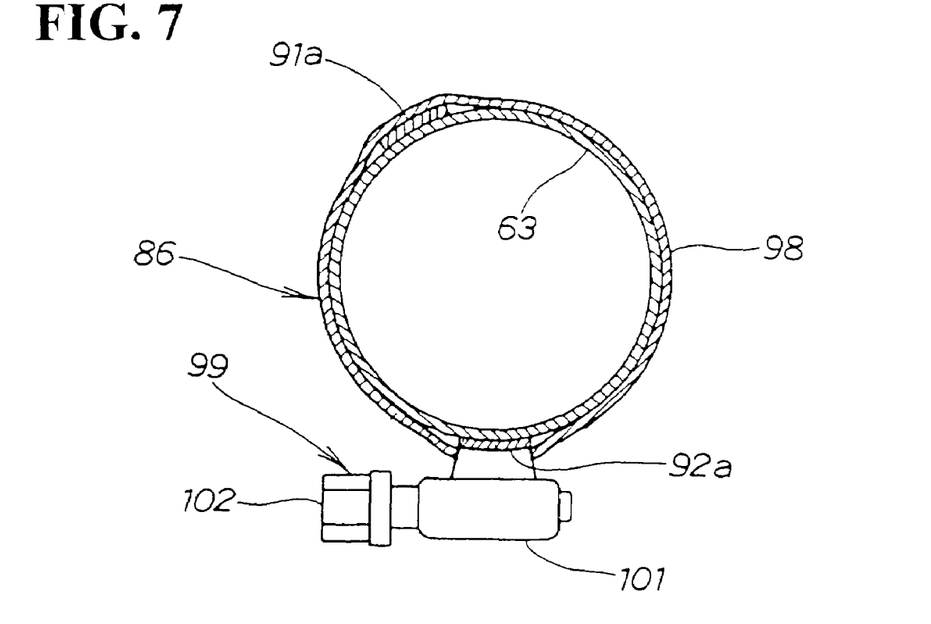
FIG. 7 is a cross section along line 7-7 in FIG. 5.

FIG. 7 is a cross section along line 7-7 in FIG. 5, and shows an upper projection section 91a provided on the end of the upper plate 91 (refer to FIG. 6(a)) of the first heat shield plate 82 (refer to FIG. 6(a)), a lower projection section 92a provided on the end of the lower plate 92 (refer to FIG. 6(a)), and the upper projection section 91a and lower projection section 92b being fastened with a band member 86 and attached to the U-shaped exhaust pipe 63.

The band member 86 is made up of a band 98 and a tightening section 99 for tightening the band 98. The tightening section 99 is made up of a case 101, and a bolt 102 rotatably attached to the case 101.

The band 98 has one end attached to the case 101, and a plurality of slits (not shown) substantially orthogonal to the longitudinal direction of the band 98 provided on the other end. The bolt 102 has an external thread (not shown), and this external thread engages with the slits of the band 98 inside the case 101.

Accordingly, if the bolt 102 is turned with a tool, the other end of the band 98 is fed in the longitudinal direction by the external thread of the bolt 102, which means that the band 98 can be tightened or loosened.

Figure 8:
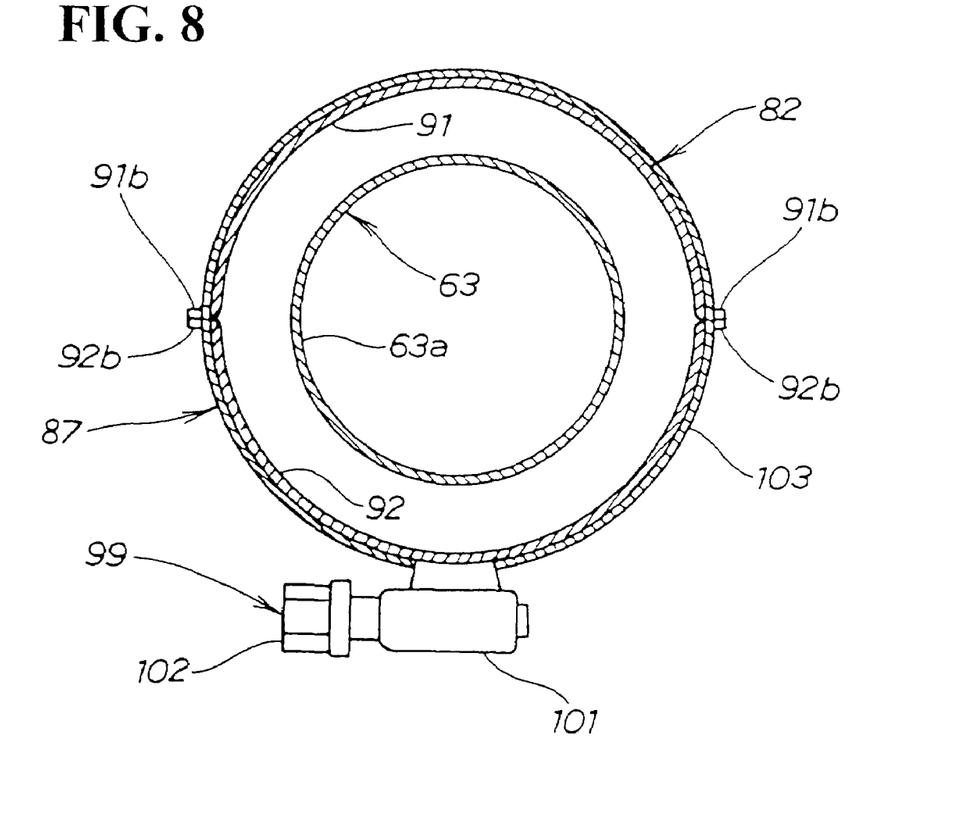
FIG. 8 is a cross section along line 8-8 in FIG. 5.

FIG. 8 is a cross section along line 8-8 in FIG. 5, and shows an upper plate 91 and a lower plate 92, respectively having a cross-section of a half-cut tube, fastened by the band member 87, giving the first heat shield plate 82a two-part structure, which surrounds the curved section 63a of the U-shaped exhaust pipe 63.

In this way, it is possible to easily shield heat irradiated from the curved section 63a, which has become hot in the vicinity of the exhaust port of the engine, with respect to the outside, with a simple structure.

The band member 87 is different from the band member 86 by only the length of the band 103, and the remaining structure is the same. Flanges 91b, 91b are provided on the upper plate 91, and flanges 92b, 92b are provided on the lower plate 92.

Figure 9:
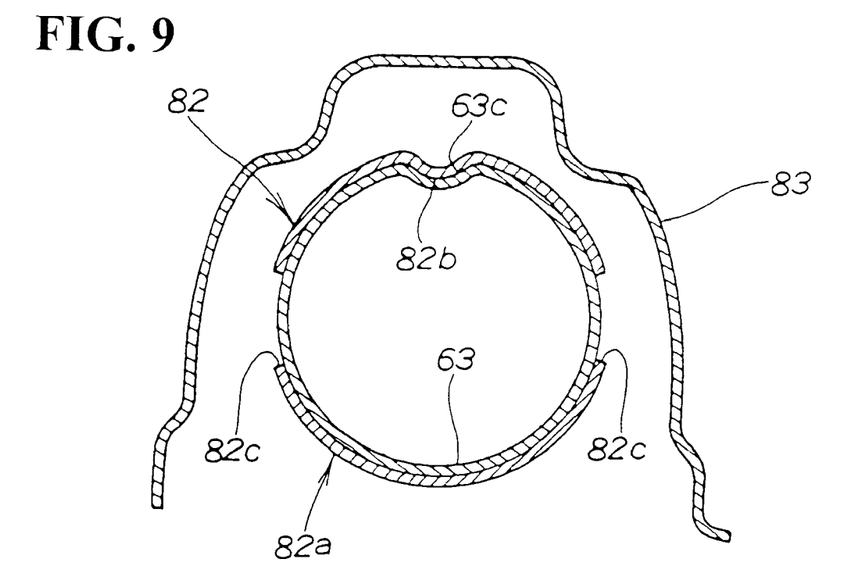
FIG. 9 is a cross section along line 9-9 in FIG. 6(a)

FIG. 9 is a cross section along line 9-9 in FIG. 6(a), and shows the first heat shield plate 82 positioned on the U-shaped exhaust pipe 63 by aligning the projecting section 82b of the first heat shield plate 82 with the indented section 63c of the U-shaped exhaust pipe 63, and covering above and to both sides of a section where the U-shaped exhaust pipe 63 and the first heat shield plate 82 are aligned with the second heat shield plate 83.

The first heat shield plate 82 is provided with notched sections 82c, 82c in a small diameter section 82a, being end sections, which constitute a structure for preventing warping due to heat.

Figure 10:
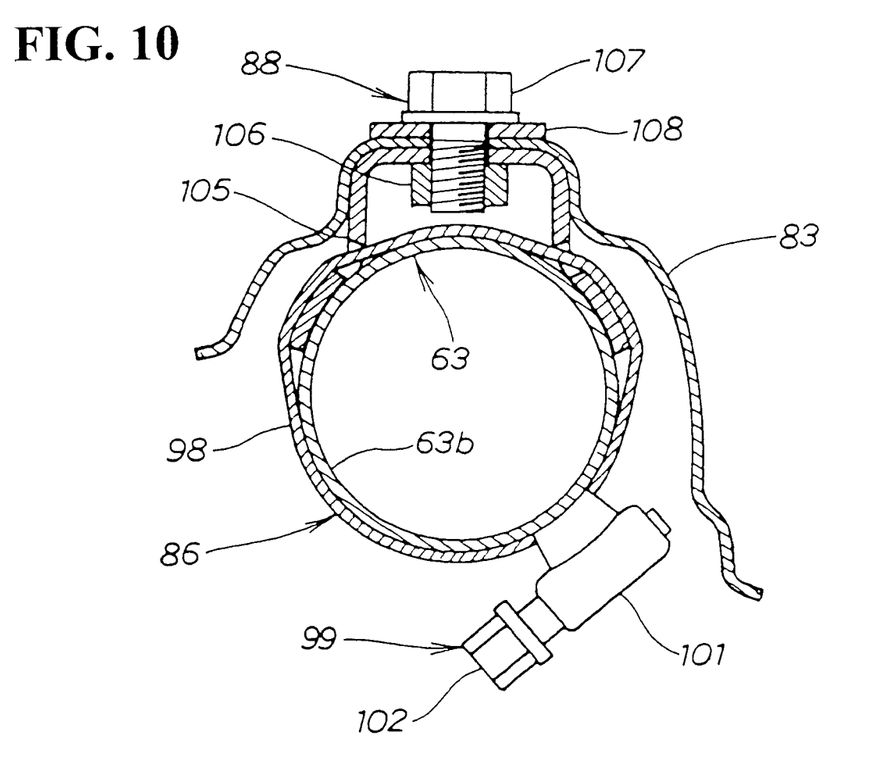
FIG. 10 is a cross section along line 10-10 in FIG. 6(a)

FIG. 10 is a cross section along line 10-10 in FIG. 6(a), and shows the second heat shield plate 83 attached to a straight section 63b of the U-shaped exhaust pipe 63 with heat shield attachment fixtures 88. The heat shield attachment fixtures 88 comprise a socket fixture 105 for receiving the second heat shield plate 83, a bolt 107 for fixing the second heat shield plate 83 to the socket fixture 105 by screwing into a nut 106 attached to the socket fixture 105, and the band member 86 for fixing the socket fixture 105 to the U-shaped exhaust pipe 63. Also shown is a washer 108.

The band member 86, as shown in FIG. 10, can move the tightening section 99 to a desired position of the U-shaped exhaust pipe 63, which means that it is possible to be located at a place that is not exposed to the outside, taking into account a place where the tightening section will not interfere with other components and also the general appearance.

Figure 11:
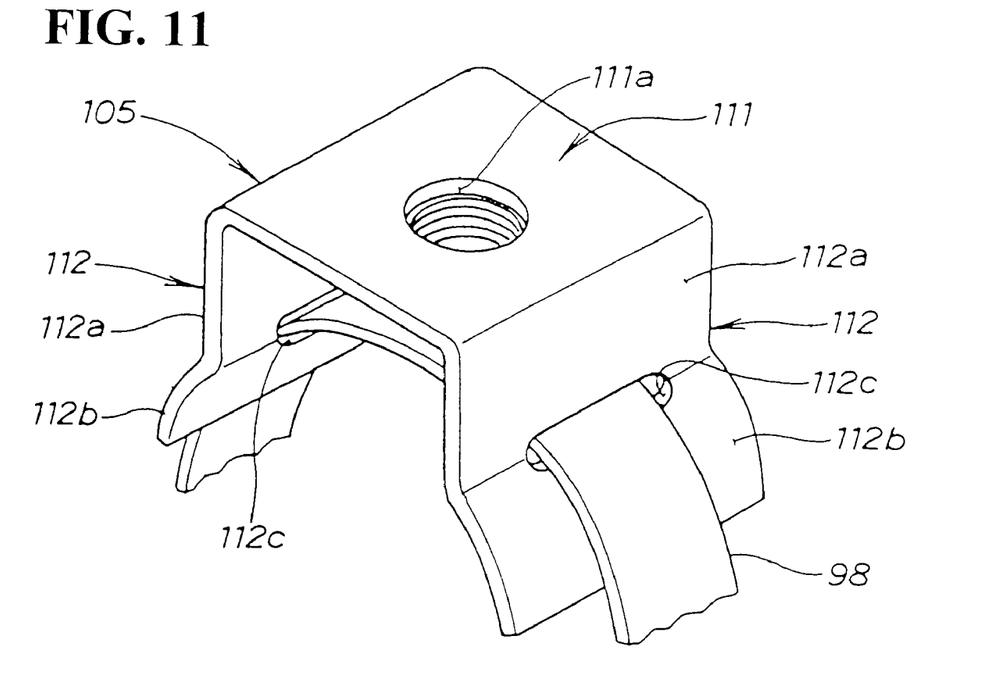
FIG. 11 is a perspective drawing showing essential parts of a heat shield attachment fixture relating to the present invention.

FIG. 11 is a perspective drawing showing essential parts of a heat shield attachment fixture relating to the present invention. The socket fixture 105 is made up of a receiving section 111 for receiving the second heat shield plate, and feet sections 112, 112 extending downwards from both ends of the receiving section 111. A bolt hole 11a is formed in the receiving section 111 for the bolt to pass through, the feet sections 112 comprise a vertical section 112a and an arced section 112b, and band passing holes 112c are formed by sections where the feet sections 112a and the arced sections 112b meet, for passing the band 98 through. As shown in FIG. 10, the arced sections 112b, 112b press against the U-shaped exhaust pipe 63, and these arced sections 112b, 112b are tightened up on the U-shaped exhaust pipe 63 by the band member 86.

Operation of the first heat shield plate 82 and the second heat shield plate 83 described above will now be described.

Figure 12:
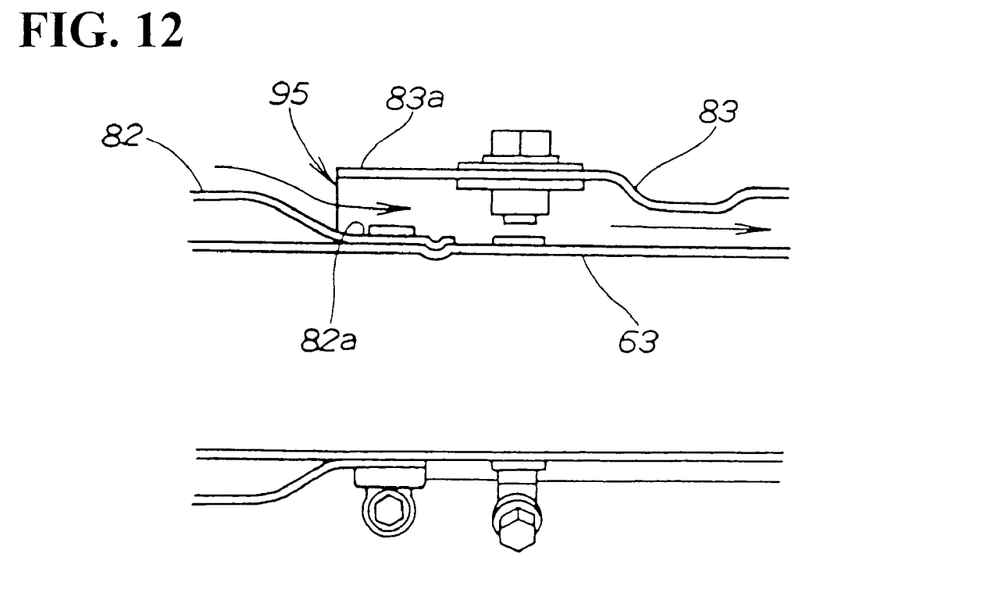
FIG. 12 is an operational drawing showing operation of the first and second heat shield plates relating to the present invention.

FIG. 12 is an operational drawing showing operation of the first and second heat shield plates relating to the present invention.

By overlapping the front end 83a of the second heat shield plate 83 on the small diameter section 82a of the first heat shield plate 82, as well as providing a gap 95 between the small diameter section 82a and the front end 83a, during travel of the vehicle travel wind enters into the gap 95 from the front of the vehicle and passes between the U-shaped exhaust pipe 63 and the second heat shield plate 83, as shown by the arrow in the drawing.

It is therefore possible to promote cooling of the U-shaped exhaust pipe 63.

Figure 13:
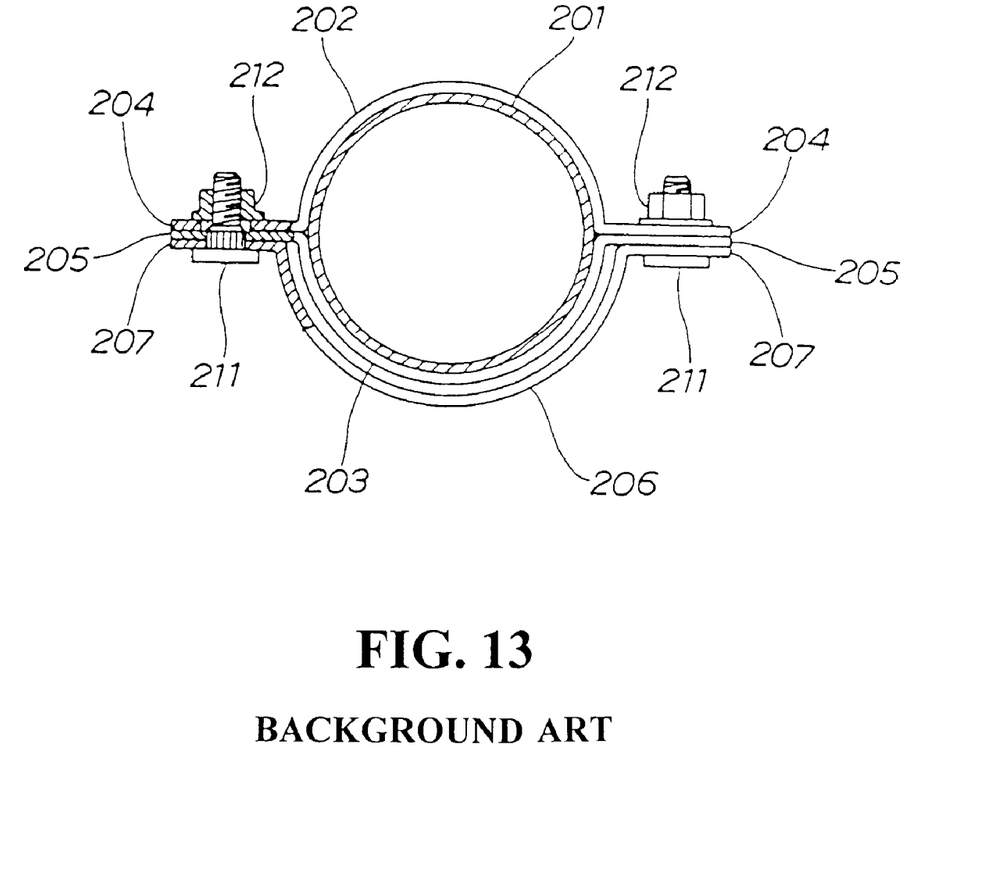
FIG. 13 is a cross sectional drawing showing a comparative example of a band member for attaching a heat shield plate to an exhaust pipe.

FIG. 13 is a cross sectional drawing showing a comparative example of a band member for attaching a heat shield plate to an exhaust pipe (refer to the partial cross section, for example, of Japanese Utility Model Laid-open No. Hei. 2-40924), and shows an exhaust pipe 201 enclosed by support bands 202, 203, respectively bent out sections 204, 205 formed on these support bands 202, 203, bent out sections 207, 207 formed on a heat shield plate 206, and an exhaust pipe 201 attached to the heat shield plate 206 by overlapping the bent out sections 204, 205, 207, 207 and fastening together using attachment bolts 211, 211 and nuts 212, 212.

In FIG. 13, a large amount of space is occupied by the support bands 202, 203, because the bent sections 204, 205 project a long way out on both sides of the exhaust pipe 201. Also, since the bent sections 207 are also formed on the heat shield plate 206, there is an increase in cost. In this comparative example, it would be desirable to reduce the number of components and suppress cost increase if the two sets of attachment bolts 211 and nuts 212 could be made into a single set.

In contrast to the comparative art device, with the band member 86 shown in FIG. 10 of the present invention, since the tightening section 99 is provided at one location circumferentially, the number of components is reduced, and since there is only a single projecting section, it is possible to make effective use of space around the U-shaped exhaust pipe 63.

As has been described above in FIG. 4 and FIG. 5, the present invention firstly provides a heat shield for an internal combustion engine exhaust system for supporting a first heat shield plate 82 and a second heat shield plate 83 on a U-shaped exhaust pipe 63 extending from an exhaust port 81a of an engine 16, via a support member such as band members 86, 87. In this novel configuration, the first heat shield plate 82 for covering all around the U-shaped exhaust pipe 63 is provided on a curved section 63a of the U-shaped exhaust pipe 63 provided in the vicinity of the exhaust port 81a, and the second heat shield plate 83 for covering above the U-shaped exhaust pipe 63 is provided at a straight section 63b of the U-shaped exhaust pipe 63 connecting to the curved section 63a.

With the present invention, by providing the first heat shield plate 82 for covering all around the curved section 63a of the U-shaped exhaust pipe 63 which is in the vicinity of the engine 16, without using the two-part exhaust pipe as in the related art, because of the U-shaped exhaust pipe 63, first heat shield plate 82 and band members 86, 87, it is possible to easily have a first heat shield plate with a two-part structure that does not require the advanced technology of the related art without carrying out welding or the like, a heat shielding effect is exhibited and it is possible to reduce cost.

Secondly, as shown in FIG. 6(b), the present invention provides a small diameter section 82a on the first heat shield plate 82, and a front end section 83a of the second heat shield plate 83 is overlapped with this small diameter section 82a via a gap 95. By overlapping the small diameter section 82a of the first heat shielding plate with the front end section 83a of the second heat shield plate 83 via the gap 95, it is possible for travel wind to enter from the gap 95 into a gap between the U-shaped exhaust pipe 63 and the second heat shield plate 83. As a result, it is possible to improve the cooling characteristics of the U-shaped exhaust pipe 63.

With the present invention, it is also possible for the support members for the band members and heat shield plate attachment fixtures of the present invention to be used for attaching a third heat shield plate to a middle exhaust pipe 64, and to attach a silencer heat shield plate to a silencer 65.

With the above-described structure, the present invention exhibits the following effects. According to the first aspect of the present invention, the internal combustion engine exhaust system heat shield includes a first heat shield plate for covering all around the exhaust system members provided on a curved section of the exhaust system members provided in the vicinity of an exhaust port, and a second heat shield plate for covering above the exhaust system members provided at a straight section of the exhaust system members connecting to the curved section. This means that by providing the first heat shield plate for covering all around the exhaust system members on a curved section in the vicinity of an engine, without using the a two-part exhaust pipe, it is possible to easily achieve a two-part structure for the first heat shield plate, while still enabling the heat shield to provide an effective heat shielding effect. Also, it is possible to reduce cost.

According to the second aspect of the present invention, the internal combustion engine exhaust system heat shield includes a small diameter section provided on the first heat shield plate, and an end section of the second heat shield plate is overlapped with this small diameter section via a gap. This means that it is possible for travel wind to enter from the gap into a gap between the exhaust system members and the second heat shield plate, and it is possible to improve the cooling characteristics of the exhaust system members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat shield for a vehicle having an exhaust system member extending from an exhaust port of an internal combustion engine, the heat shield comprising:
   a first heat shield plate for surrounding a curved section of the exhaust system member, the curved section being provided in the vicinity of the exhaust port;
   a second heat shield plate for covering above a straight section of the exhaust system member, the straight section connecting to the curved section; and
   a band member for supporting the first heat shield plate on the exhaust system member,
   wherein a small diameter section is provided on an end section of the first heat shield plate, and a front end section of the second heat shield plate overlaps the small diameter section along a length of the exhaust system member, with a gap being provided in a radial direction between the small diameter section of the first heat shield plate and the front end section of the second heat shield plate,
   wherein the gap provides an opening facing toward a front side of the vehicle so that travel wind from the front side of the vehicle passes though the gap between the first and second heat shield plates.

2. The heat shield for an internal combustion engine exhaust system of claim 1, wherein the exhaust system member is a U-shaped exhaust pipe which extends forwardly from the exhaust port of the engine, curves rearwardly, and extends in a substantially straight manner along one side of the engine to a position where the U-shaped exhaust pipe joins a middle pipe.

3. The heat shield for an internal combustion engine exhaust system of claim 2, wherein the U-shaped exhaust pipe is formed as a one-part pipe.

4. The heat shield for an internal combustion engine exhaust system of claim 1, wherein the first heat shield plate includes an upper plate and a lower plate which mate together to surround an entire outer circumference of the curved section of the exhaust system member.

5. The heat shield for an internal combustion engine exhaust system of claim 4, wherein the upper plate and the lower plate are joined by the band member.

6. The heat shield for an internal combustion engine exhaust system of claim 1, wherein an end of the first heat shield plate adjacent to the exhaust port of the engine includes projection sections, and the band member presses the projection sections against the exhaust system member to attach the first heat shield plate to the exhaust system member.

7. The heat shield for an internal combustion engine exhaust system of claim 1, wherein the end section of the first heat shield plate away from the exhaust port is fixed tightly around the exhaust system member by the band member, and the front end section of the second heat shield plate extends forwardly over the band member, the front end section of the second heat shield member being fixed to the exhaust system member by an attachment fixture including a bolt, the attachment fixture providing a space between the second heat shield plate and the exhaust system member through which air passes during travel.

8. The heat shield for an internal combustion engine exhaust system of claim 1, wherein the small diameter section of the first heat shield plate includes projections fitting into indented sections of the exhaust system member.

9. The heat shield for an internal combustion engine exhaust system of claim 1, wherein an intermediate portion of the first heat shield plate has a diameter larger than a diameter of the exhaust system member, and the band member wraps around the intermediate portion of the first heat shield plate.

10. The heat shield for an internal combustion engine exhaust system of claim 1, wherein the second heat shield member is separated from the exhaust system member by an attachment fixture including a bolt,
    the attachment fixture providing a space along an entire length of the second heat shield plate,
    so that during travel, the travel wind passing through the gap at the front end section of the second heat shield plate flows between the second heat shield plate and the exhaust system member along the entire length of the second heat shield plate.

11. A heat shield for an exhaust system member extending from an exhaust port of an internal combustion engine, comprising:
    a first heat shield plate for surrounding substantially all of a curved section of the exhaust system member, the curved section of the exhaust system member extending from the exhaust port;
    a second heat shield plate mounted over a straight section of the exhaust system member, the straight section connecting to the curved section; and
    a band member for supporting the first heat shield plate on the exhaust system member,
    wherein the first heat shield plate is formed as a single plate extending along at least half way along the curved section of the exhaust system member,
    wherein a rear end section of the first heat shield plate is in direct contact with the exhaust member and a front end section of the second heat shield plate is separated from the exhaust system, thereby forming a gap between the rear end section of the first heat shield plate and the front end section of the second heat shield plate,
    wherein the gap provides an opening facing toward a front side of the vehicle so that travel wind from the front side of the vehicle passes though a gap between the first and second heat shield plates,
    wherein a small diameter section is provided on the rear end section of the first heat shield plate, and the front end section of the second heat shield plate overlaps the small diameter section along a length of the exhaust system member, with the gap in a radial direction being provided between the small diameter section of the rear end section of the first heat shield plate and the front end section of the second heat shield plate.

12. The heat shield for an internal combustion engine exhaust system of claim 11, wherein the exhaust system member is a U-shaped exhaust pipe which extends forwardly from the exhaust port of the engine, curves rearwardly, and extends in a substantially straight manner along one side of the engine to a position where the U-shaped exhaust pipe joins a middle pipe.

13. The heat shield for an internal combustion engine exhaust system of claim 12, wherein the U-shaped exhaust pipe is formed as a one-part pipe.

14. The heat shield for an internal combustion engine exhaust system of claim 11, wherein the first heat shield plate includes an upper plate and a lower plate each having flanges on inner and outer edges thereof, the flanges of the upper plate mating with the flanges of the lower plate, so that the upper plate and the lower plate surround the exhaust system member.

15. The heat shield for an internal combustion engine exhaust system of claim 14, wherein the upper plate and the lower plate are joined by the band member and surround an entire outer circumference of the curved section of the exhaust system member.

16. The heat shield for an internal combustion engine exhaust system of claim 11, wherein an end of the first heat shield plate adjacent to the exhaust port of the engine includes projection sections, and the band member presses the projection sections against the exhaust system member to attach the first heat shield plate to the exhaust system member.

17. The heat shield for an internal combustion engine exhaust system of claim 11, wherein the rear end section of the first heat shield plate away from the exhaust port is fixed tightly around the exhaust system member by the band member, and the front end section of the second heat shield plate extends forwardly over the band member, the front end section of the second heat shield member being fixed to the exhaust system member by an attachment fixture including a bolt, the attachment fixture providing a space between the second heat shield plate and the exhaust system member through which air passes during travel.

18. The heat shield for an internal combustion engine exhaust system of claim 11, wherein the small diameter section of the first heat shield plate includes projections fitting into indented sections of the exhaust system member.

19. The heat shield for an internal combustion engine exhaust system of claim 11, wherein an intermediate portion of the first heat shield plate has a diameter larger than a diameter of the exhaust system member, and the band member wraps around the intermediate portion of the first heat shield plate.

20. The heat shield for an internal combustion engine exhaust system of claim 11, wherein the second heat shield member is separated from the exhaust system member by an attachment fixture including a bolt,
the attachment fixture providing a space along an entire length of the second heat shield plate,
so that during travel, the travel wind passing through the gap at the front end section of the second heat shield plate flows between the second heat shield plate and the exhaust system member along the entire of length the second heat shield plate.

21. A heat shield for a vehicle having an exhaust system member extending from an exhaust port of an internal combustion engine, the heat shield comprising:
a first heat shield plate for surrounding a curved section of the exhaust system member, the curved section being provided in the vicinity of the exhaust port;
a second heat shield plate for covering above a straight section of the exhaust system member, the straight section connecting to the curved section; and
a band member for supporting the first heat shield plate on the exhaust system member,
wherein the end section of the first heat shield plate away from the exhaust port is fixed tightly around the exhaust system member by the band member, and the end section of the second heat shield plate extends forwardly over the band member, the end section of the second heat shield member being fixed to the exhaust system member by an attachment fixture including a bolt, the attachment fixture separating the second heat shield member from the exhaust system member and providing a space between the second heat shield plate and the exhaust system member along an entire length of the second heat shield member through which air passes from front to back during travel.

* * * * *